(No Model.)
W. J. MAY.
ELEVATED ROAD AND BICYCLE FOR SAME.
No. 600,371. Patented Mar. 8, 1898.
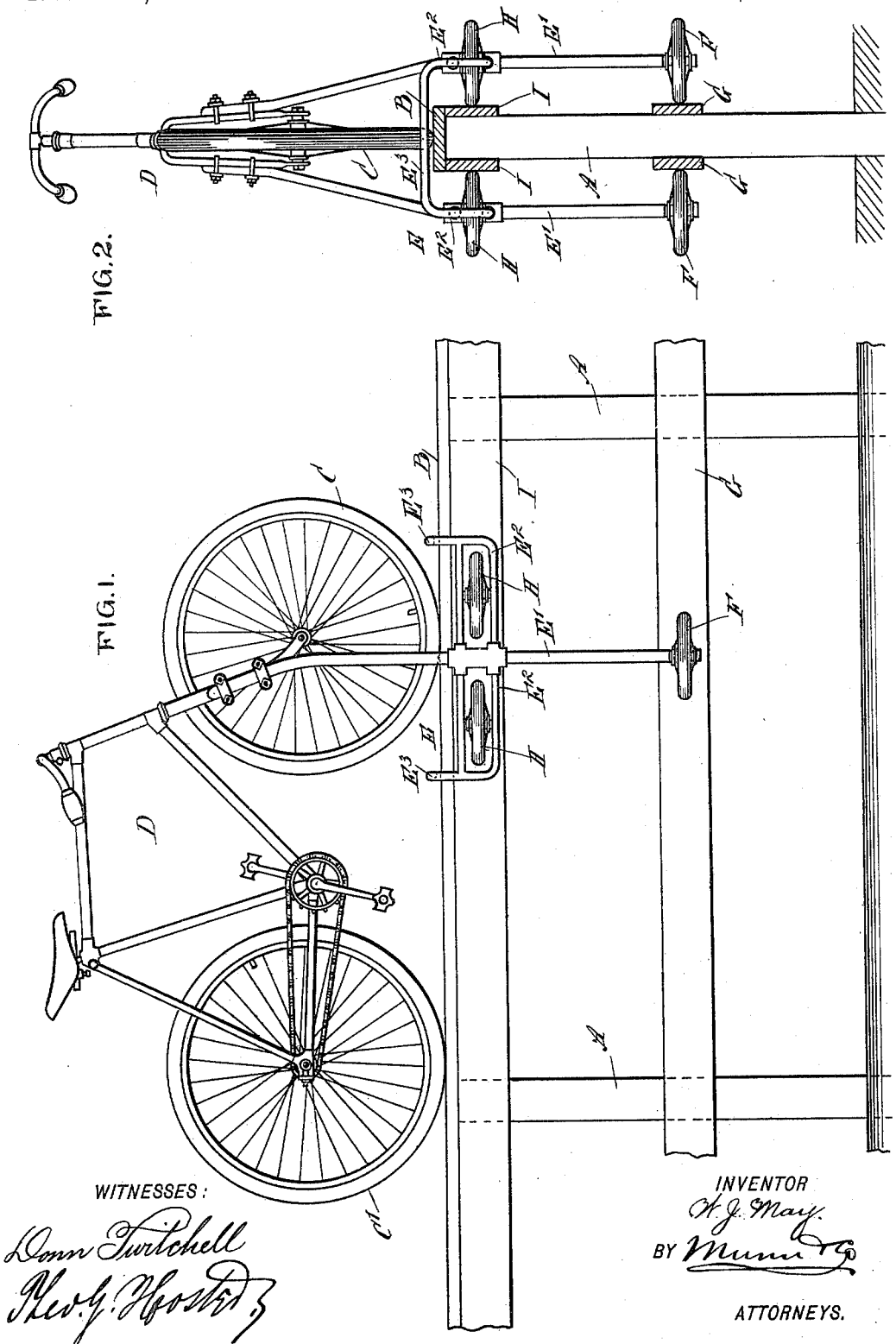
WITNESSES:
INVENTOR
BY
ATTORNEYS.

UNITED STATES PATENT OFFICE.

WILLIAM J. MAY, OF TILLAMOOK, OREGON.

ELEVATED ROAD AND BICYCLE FOR SAME.

SPECIFICATION forming part of Letters Patent No. 600,371, dated March 8, 1898.

Application filed June 16, 1897. Serial No. 641,009. (No model.)

*To all whom it may concern:*

Be it known that I, WILLIAM J. MAY, of Tillamook, in the county of Tillamook and State of Oregon, have invented a new and Improved Elevated Road and Bicycle for the Same, of which the following is a full, clear, and exact description.

The object of the invention is to provide a new and improved elevated road and bicycle for the same arranged to permit a rider to readily, safely, and rapidly propel himself from one place to another.

The invention consists principally of an elevated rail for the wheels of a bicycle to travel on, guide-rails arranged at the sides and below the said elevated rail, and a bicycle attachment comprising a frame adapted to be secured to the bicycle and guide rollers or wheels held on the said frame and adapted to travel on the said guide-rails.

The invention also consists of certain parts and details, and combinations of the same, as will be fully described hereinafter and then pointed out in the claims.

Reference is to be had to the accompanying drawings, forming a part of this specification, in which similar characters of reference indicate corresponding parts in both the figures.

Figure 1 is a side elevation of the improvement, and Fig. 2 is a transverse section of the same.

The improved elevated bicycle-road is provided with posts A set in the ground or other support and placed a suitable distance apart. On the top of the posts A is secured a rail B, on which are adapted to travel the wheels C C' of a bicycle D, of any approved construction.

On the front fork of the bicycle D is secured a frame E, preferably provided with two depending rods E', clamped or otherwise attached to the members of the fork, as is plainly indicated in the drawings, each of the rods E' being provided at its lower end with a roller or wheel F, extending horizontally and adapted to travel on the vertical face of a guide-rail G, secured to the posts A a suitable distance below the rail B, as plainly indicated in the drawings. On the rods E' are also secured longitudinally-extending frames $E^2$, connected with each other by cross-pieces $E^3$, extending over the top of the rail B, so as to give considerable strength to the entire attachment for the bicycle. In each of the frames $E^2$ is journaled a horizontally-disposed roller or wheel H, similar to the roller F, and likewise traveling on guide-rails I, secured to the posts A at the sides of the rail B, and directly below the same, as is plainly indicated in the drawings.

Now it will be seen that by the arrangement described the bicycle D is free to travel on the rail B and is securely held in position by the attachment thereto of the frame E and the rollers F H, mounted to travel on the guide-rails G I. Thus the bicycle is always supported in a vertical position, so that the most inexperienced rider can readily learn to ride the bicycle and actuate the pedals thereof, so as to propel the bicycle and himself from one place to another.

The frame E may be readily detached from the bicycle, so that the latter can be used for ordinary riding purposes in the usual manner.

Having thus fully described my invention, I claim as new and desire to secure by Letters Patent—

1. A device of the class described, comprising an elevated rail for the wheels of a bicycle to travel on, guide-rails arranged at the sides and below the said elevated rail at two different elevations, and a bicycle attachment comprising a frame adapted to be secured to the bicycle-frame, and guide-rollers journaled on the said frame and adapted to travel on the said guide-rails, substantially as shown and described.

2. A bicycle attachment, consisting of a frame comprising rods adapted to be secured to the front fork of a bicycle, auxiliary frames secured to the said rods and connected with each other by cross-braces, rollers journaled on the lower ends of the said rods, and rollers journaled in the said auxiliary frames, substantially as shown and described.

3. An elevated road comprising a series of posts, a top rail for the said posts, sets of guide-rails attached to the sides of the said posts below the said top rail, in combination with a bicycle attachment comprising a frame secured to the front fork of a bicycle, the wheels of which are adapted to travel on the said top rail, auxiliary frames secured to the said frame, and rollers journaled on the said auxiliary frames and on the rod forming the main frame, the said rollers being adapted to travel on the said guide-rails, substantially as shown and described.

4. An elevated road comprising a series of posts, a top rail for the said posts, and sets of guide-rails attached to the sides of the said posts below the said top rail, in combination with a bicycle attachment comprising a frame secured to the front fork of a bicycle, the wheels of which are adapted to travel on the said top rail, auxiliary frames secured to the said frame, and rollers journaled on the said auxiliary frames and on the rod forming the main frame, the said rollers being adapted to travel on the said guide-rails, the auxiliary frames being rigidly connected with each other by cross-bars, substantially as shown and described.

5. A bicycle attachment, comprising two bars attachable to the front forks of a bicycle, one upon each side thereof and extending to some distance below the wheels thereof, and wheels journaled on said bars at different elevations and turning in horizontal planes, substantially as described.

6. A bicycle attachment, comprising two bars attachable, one to each front fork and extending below the bicycle-wheels, each bar having two wheels supported therefrom and below the bicycle-wheel and revolving in substantially the same horizontal plane, and a third wheel revolving in a plane differing in elevation from the other wheels, substantially as described.

7. A bicycle attachment, comprising two bars attachable one to each front fork and extending below the bicycle-wheels, each bar having two wheels supported therefrom and below the bicycle-wheel and revolving in substantially the same horizontal plane, a third wheel revolving in a plane differing in elevation from the other wheels, and a rod connecting the said bars just above the track beneath the bicycle-wheels, substantially as described.

WILLIAM J. MAY.

Witnesses:
E. P. MERGES,
F. V. BURCKHARAT.